(12) United States Patent
Ranganathan et al.

(10) Patent No.: US 11,227,268 B2
(45) Date of Patent: Jan. 18, 2022

(54) SYSTEMS AND METHODS FOR USER DATA MANAGEMENT ACROSS MULTIPLE DEVICES

(71) Applicant: PAYPAL, INC., San Jose, CA (US)

(72) Inventors: Aravindan Ranganathan, San Jose, CA (US); Srivathsan Narasimhan, Saratoga, CA (US); Srinivasan Rangaraj, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 815 days.

(21) Appl. No.: 15/198,807

(22) Filed: Jun. 30, 2016

(65) Prior Publication Data

US 2018/0005209 A1  Jan. 4, 2018

(51) Int. Cl.
  *G06Q 20/12*   (2012.01)
  *G06Q 20/36*   (2012.01)
  *G06Q 20/32*   (2012.01)

(52) U.S. Cl.
  CPC ......... *G06Q 20/12* (2013.01); *G06Q 20/3221* (2013.01); *G06Q 20/3223* (2013.01); *G06Q 20/363* (2013.01)

(58) Field of Classification Search
  CPC ............... G06Q 20/40; G06Q 20/3221; G06Q 20/3223; G06Q 20/363; G06Q 20/12
  USPC .......................................................... 705/65
  See application file for complete search history.

(56) References Cited

U.S. PATENT DOCUMENTS

| | | | |
|---|---|---|---|
| 2008/0208743 A1* | 8/2008 | Arthur et al. | |
| 2012/0143767 A1* | 6/2012 | Abadir | |
| 2013/0124333 A1* | 5/2013 | Doughty et al. | |
| 2013/0200999 A1* | 8/2013 | Spodak | |
| 2013/0246218 A1* | 9/2013 | Gopalan | |
| 2014/0207575 A1* | 7/2014 | Freed-Finnegan | |
| 2014/0359735 A1* | 12/2014 | Lehmann et al. | |
| 2015/0134513 A1* | 5/2015 | Olson et al. | |
| 2015/0195133 A1* | 7/2015 | Sheets et al. | |
| 2016/0006719 A1* | 1/2016 | Khalil et al. | |
| 2016/0042341 A1* | 2/2016 | Griffin et al. | |
| 2016/0210626 A1* | 7/2016 | Ortiz et al. | |
| 2016/0232600 A1* | 8/2016 | Purves | |

* cited by examiner

*Primary Examiner* — James D Nigh
*Assistant Examiner* — Yin Y Choi
(74) *Attorney, Agent, or Firm* — Haynes and Boone, LLP

(57) ABSTRACT

Systems and methods for managing user data across multiple applications and devices are disclosed. An example method includes: detecting a user is conducting a transaction using a first application installed on a user device; determining that the user is requesting one or more payment options from a first merchant associated with the first application; determining that a global payment method is selected by the user; determining that the user device is a trusted device associated with the user; and in response to determining that the user device is a trusted device, providing the global payment method to the user in the first application on that same device or a different device.

20 Claims, 9 Drawing Sheets

SYSTEMS AND METHODS FOR USER DATA MANAGEMENT ACROSS MULTIPLE DEVICES

TECHNICAL FIELD

The present disclosure relates generally to data management and in particular to user data management across multiple applications and devices.

BACKGROUND

Requiring a user to replicate data from one device to another device can be time-consuming and hence frustrating.

For example, when switching to a new smartphone, a user may be required to find and download her favorite apps to the new smartphone first and then copy application data, as well as user preferences, from an old smartphone to the new smartphone. The problem exacerbates when a user uses a large number of apps or operates multiple devices.

There is therefore a need for a device, system, and method, which reduces the amount of user efforts required for enabling, in one application, features previously enabled in another application or on a different device.

Figure 1:
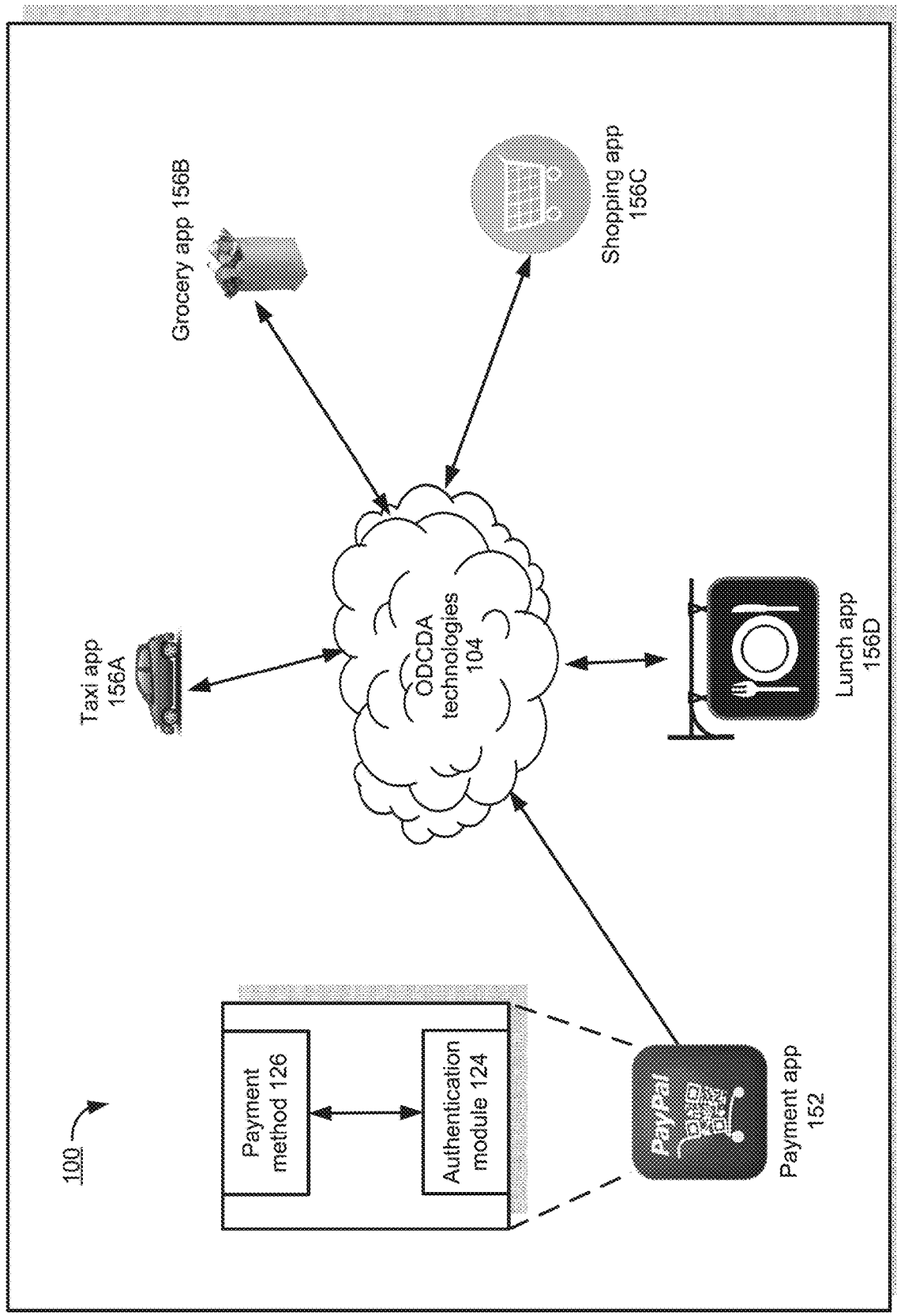
FIG. 1 is a schematic view illustrating an embodiment of a system for managing user data across multiple applications.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for managing user data (e.g., user preference data) across multiple applications and devices. The term 'user' may refer to a customer entity often represented by a unique account on the provider platform, e.g., individual or household entity, business entity, organizational entity.

In one implementation, when a user is paying for a take-out lunch through a restaurant app installed on her smartphone, the user may select a certain credit card as her preferred payment method, e.g., because the credit card offers a greater amount of cash back than other payment methods available on or through her smartphone. This preferred payment method is henceforth called 'user preference'.

This user preference may be remembered on the smartphone for future applications. For example, when the user is paying for a taxi ride through a taxi-sharing app on the smartphone, the credit card (with which the user paid for the lunch) may be automatically provided as the default or sole payment method in the taxi-sharing app.

Further, this user preference may also be shared with and applied on other devices of the user. For example, when the user is paying to watch a streaming program on her connected-TV device at home, the user may be offered the same credit card as the payment method.

In some implementations, a user-preferred payment method (the credit card she used for her taxi ride, her lunch, and the streaming program) may be referred to as a global payment method (GPM), as the user may have the option of using it across multiple applications and across multiple devices.

For example, the credit card may be offered as the default (or even sole) payment method in the following cases: (1) a merchant with which the user has transacted using a specific and uniquely identifiable user device, e.g., a smartphone; (2) a merchant with which the user may be able to transact using the same uniquely identifiable smartphone device; (3) a merchant with which the user may be able to transact using any of the user's trusted devices (including, but not limited to, the uniquely identifiable smartphone device above.)

In some embodiments, a user device is considered a trusted device after a user registers the user device with a service provider (also referred to as a device on-boarding process in the present disclosure). For example, after meeting a predefined number of authentication criteria, a user can register, with the service provider, a corresponding device identifier (e.g., a phone number or an IMEI number) that identifies the user device. After a successful on-boarding process, the service provider may generate a key based on the device identifier, a user identifier, or both, and store the key in a secure element of the user device. In some embodiments, a user may have two or more trusted devices, e.g., the primary trusted device and the secondary trusted device.

In some implementations, a global payment method is enabled on devices that are considered trusted devices. Technologies related to identifying and manage user trusted devices are disclosed in U.S. patent application Ser. No. 15/193,487, filed on Jun. 27, 2016, entitled "Secured key based trust chain among user devices," with Srivathsan Narasimhan, Srinivasan Rangaraj, and Aravindan Ranganathan, as inventors.

The systems and methods described in the present disclosure can provide a variety of technical advantages.

First, cognitive burden on a user to select a payment method each and every time they onboard into a new merchant app from the same device or from a different device may be reduced. For the purpose of illustrating an example, but without limiting other payment implementations, a new app provided by a merchant (henceforth referred to as a "merchant app") can be a mobile shopping app and the payment experience to pay for items purchased in this app. Once a user designates a GPM for one merchant through one application, that preference can be automatically applied when the user is transacting with a different merchant, either through a different application, or on a different device, or both.

Second, merchants may gain a greater degree of fine-tuning control and offer this option to secure their payment flows and increase conversion rates for specific user.

Third, a dilution of benefits caused by a fragmentation of payment options across different applications and different devices can be reduced, and as a result, a payment service provider (PSP) may be able to offer more benefits (e.g., loyalty or reward) to either a merchant or a consumer.

Additional details of implementations are now described in relation to the Figures.

FIG. 1 is a schematic view illustrating an embodiment of a system 100 for managing user data across multiple applications. The system 100 may comprise or implement a plurality of servers and/or software components that operate to perform various technologies provided in the present disclosure.

The system 100 may implement the following features: (1) combining a hierarchy of tokens (e.g., a global token, a device token, and a payment token) that uniquely captures a user's intent and consent to manage payment methods across multiple applications and devices; (2) re-using user consent gathered in one application in other applications running on the same or a different device, to create seamless channel agnostic consumer experience across merchant apps, a PSP app, and partner apps on a single device; (3) using secure token federations to create trust chains across multiple devices, thereby expanding the seamless channel agnostic consumer experience onto multiple trusted devices. The act of providing consent (or consent the verb for short) by the user described herein includes (a) presenting a detailed explanation of the specific behavior or capability the user is signing up for, (b) related impact to the user and (c) receiving explicit and specific acknowledgement and authorization to enable the capability in return for the consent. A person skilled in the art may recognize that there are other ways to gather user consent.

These features may be collectively referred to as the ODCDA (On device and Cross-device authentication) technologies. The ODCDA technologies can enable a user to replicate a default payment preference across multiple applications on a device and across devices with reduced efforts. The default payment method identified by the default payment preference may be also referred to as the GPM in the present disclosure. Consequently, the scope of consent in this application covers (i) on-device and across applications, (ii) across devices and therefore across applications across these devices.

In some implementations, to enable a GPM (e.g., one that is provided through the payment app 152) on one or more merchant apps on a same user device, the merchant apps may first need to be integrated with the payment app.

Merchant apps may be integrated with a payment app (and the global payment method provided therein) provided by a payment service provider using the following steps, where one or more steps may be combined, deleted, added, or performed in a different sequence in different embodiments.

A merchant may integrate one or more its app (e.g., the taxi app 156A and the grocery app 156B) with the PSP's Software Development Kit (SDK), which allows a server system of the PSP (e.g., then authentication server 160) to determine whether changing the preferred payment option in a merchant app is possible.

For example, if a special ODCDA flag within a merchant app is set to 1, which suggests that payment methods provided through the merchant app are modifiable, then the merchant app may be identified as integratable with the payment app.

If, alternatively, the ODCDA Flag is set to 0, which suggests that payment methods provided through the merchant app are not modifiable, then the merchant app may be identified as non-integratable with the payment app.

A merchant app may then be further integrated with a device identification program (e.g., a software component that gathers information identifying a user device) provided by the PSP. This second integration may obtain device related information including but not limited to a device identifier or machine ID, information identifying whether the device is a strong device identifier, a device profile, and one or more web browser cookies present on the device etc. One skilled in the art would know relevant technologies and methods to determine a unique device fingerprint and to assess the level of risk exposure—either high or low of this activity.

A merchant app may also share with the PSP, certain user data stored by the merchant in a separate online or offline payload back to the PSP to evaluate the overall risk assessment for the account on this device at the time of the payment In some implementations, for any interactions with the PSP's payment infrastructure, the merchant is verified as having a registered account with the PSP.'

Merchant apps on which a GPM may be enabled can be discovered in accordance with a list provided by the PSP and maintained on the authentication server 106; the list may include a plurality of merchant apps and partner apps in each app category that support the ODCDA technologies, and user can link/navigate to an app store to download these apps or the payment provider system may automatically download one or more supported merchant or partner apps to a user device. The PSP may enable a global payment method (GPM) through a payment app 152 installed on a user device.

The payment app 152 may be downloaded and installed on a user device; a user of the user device may then be on-boarded (e.g., registering a new account or authenticating to log into an existing account). Touch ID technologies (e.g., user authentication using a biometric) may also be enabled for future authentication as part of the on-board process. However, the installation of the payment app 152 while key is not a pre-requisite blocker for the system to work as defined below. As contemplated below, one can imagine instances when (i) the payment app is installed before the merchant app, (ii) the payment app is installed after the merchant app (iii) the payment app is never installed on this device.

Here the TouchID technologies are described as an example, but not the only, way of authenticating a user using user biometric data or using two-factor authentication (with "what you have" and "what you are"). Note that a three-factor authentication additionally requires "what you know," e.g., a user password.

The authentication server 106 may collect device information that uniquely identifies a user device, e.g., a device fingerprint, though the payment app 152 and user activities on other apps, e.g., a browser app or an email app, installed on the user device. The authentication server may then create a unique account-device identifier, also referred to as a device token in the present disclosure. This process is termed as a payment account-device "binding" process.

The payment account-device binding relationship is maintained on the authentication server along with the device (or app) fingerprint and device profile (e.g., device token, and a risk assessment of the device).

A method of contact, e.g., a phone number associated with the device, may also be stored on the authentication server as a fall back mechanism in case the device is lost and the preferred GPM needs to be recovered. In such an event, the phone number can be confirmed via a one-time passcode sent via a SMS message or through a trusted device that supports strong authentication credentials, such as FIDO credentials.

In one other alternative embodiment, the authentication module 124 may authentication a user using FIDO technologies. The passwordless FIDO technology is supported by the Universal Authentication Framework (UAF) protocol. In some embodiments, a user registers her device to the online service by selecting a local authentication mechanism such as swiping a finger, looking at the camera, speaking into the microphone, entering a PIN, etc. The UAF protocol allows the service to select which mechanisms are presented to the user.

The second factor FIDO technology is supported by the Universal Second Factor (U2F) protocol. This technology allows online services to augment the security of their existing password infrastructure by adding a strong second factor to user login. The user logs in with a username and password as before. The service can also prompt the user to present a second factor device at any time it chooses. The strong second factor allows the service to simplify its passwords (e.g. 4-digit PIN) without compromising security.

A user of the user device may enable a global ODCDA feature (e.g., a purchase with a default payment method button). In one embodiment, this user preference may be saved in the account level settings on the payment app 152. In another embodiment, this setting preference can be saved in a server maintained by the PSP. This "buy with a specific payment method" feature may be enabled across all ODCDA-enabled existing merchant and partner on the user device, as well as ODCDA-enabled merchant and partner apps to be installed on the user device in the future.

Applying the ODCDA technologies 104 to an existing app (e.g., an app that was installed before the payment app is installed) may include the following steps.

After a user downloads, installs, and boards on a merchant app, the user may further enable biometric (e.g., Touch ID) authentication, FIDO authentication, any other authentication on the merchant app.

Once a merchant app is on-boarded on a user device, APIs provided by the PSP SDK that is part of the merchant app may connect to the authentication server 106.

The authentication server, upon a successful connection, may recognize the user device based on its browser activities (e.g., logins) associated with the authentication server, with the risk assessment server, and based on other existing web browser artifacts (e.g., email logins).

The authentication server may not recognize the user device when user's history of activities on the user device are less than a predefined amount, e.g., no prior login or transaction history or no active logins with a payment account. In this case, a user may sign up for a new account (e.g., boards) or logs into an existing account, through the merchant app. The user may, within the merchant app, consent to use the ODCDA technologies on the user device.

When a user later launches the payment app 152, the payment app may scan a system or application registry, which stores information identifying software programs installed on the user device, to discover which new apps have been installed on the user device since its last execution, as well as which new apps have enabled the ODCDA technologies.

Based on the scanning, the payment app may detect apps with ODCDA enabled and apps that support, but have not otherwise enabled ODCDA technologies.

If a merchant app (e.g., the lunch app 156D) has not enabled the ODCDA technologies, the payment app may create in-app experiences (e.g., within the payment app) to enable the ODCDA technologies (e.g., the payment method 126) in the merchant app (e.g., the lunch app 156D), thereby overriding an existing payment option in the merchant app, including and not limited to replacing any existing set of payment buttons with the preferred GPM of the user, ranking the preferred GPM at the top placement of all existing payment methods, redrawing the original page or section of the page to modify the placement and behavior of the payment button etc.

In another embodiment, the merchant app and the PSP may pre-determine the payment panel hosting all the payment methods on a page is editable by the PSP. The merchant app may hand over the control of the payment panel to the PSP.

Applying the ODCDA technologies to an app installed after the payment app is installed on a user device may include the following steps.

After a user downloads, installs, and authentication on a merchant app, the user may further enable biometric (e.g., Touch ID) authentication, FIDO authentication, or any other user authentication means on the merchant app.

Once a merchant app is on-boarded on a user device, an API provided by a PSP SDK that is part of the merchant app may connect to the authentication server 106. Note that because the payment app 152 has already been installed on the user device, the authentication server already has the information necessary to identify the user device, e.g., the device identifier other any other type of device fingerprint.

Based on (1) the device identifier and (2) the account-device binding relationship previously identified, for example, the authentication server may identify the account linked to or bounded with the user device.

Having identifying a payment account associated with (e.g., enabled on) the user device, the authentication server may next try to identify a payment account associated with (e.g., enabled within) the merchant app, to determine whether these two payment account can be combined and replaced with a single payment account.

To identify a payment account associated with (e.g., enabled within) the merchant app, a merchant server supporting the merchant app may match the payment account bounded with the user device to a user account registered with the merchant server, e.g., based on a same or similar user name, an email address, a phone number, or a home or shipping address. The account matching may be performed based on one or more string matching algorithms.

The merchant app, as part of a user checkout process, may direct the user to log into a PSP account (e.g., "BJLIUZHE") that has a predefined degree of similarity with the user account registered with the merchant server (e.g., "BJLIU-ZHEN"). Alternatively, the merchant app may send, to the authentication server, a method of communication with the user device, e.g., a phone number of a smartphone device, based on which the authentication server can initiate a communication (e.g., a push notification) through the merchant app, requesting the user to log into her payment account.

Alternatively, a user may sign into her payment account, within the merchant app, using a biometric login or a selection of a deep link to invoke the payment app. In the context of the World Wide Web browsing, deep linking is the use of a hyperlink that links to a specific, generally searchable or indexed, piece of web content on a website (e.g., "http://example.com/path/page"), rather than the website's home page (e.g., "http://example.com/"). A deep link in the context of mobile apps refers to invoking a specific page in one app (e.g., the payment confirmation page in a payment app) from another app (e.g., a merchant app).

In the context of mobile apps, deep linking consists of using a uniform resource identifier (URI) that links to a specific location within a mobile app rather than simply launching the app.

Once a user successfully logs into her payment account within or through the merchant app, the merchant app is also linked to or bounded with the user's payment account.

Figure 2:
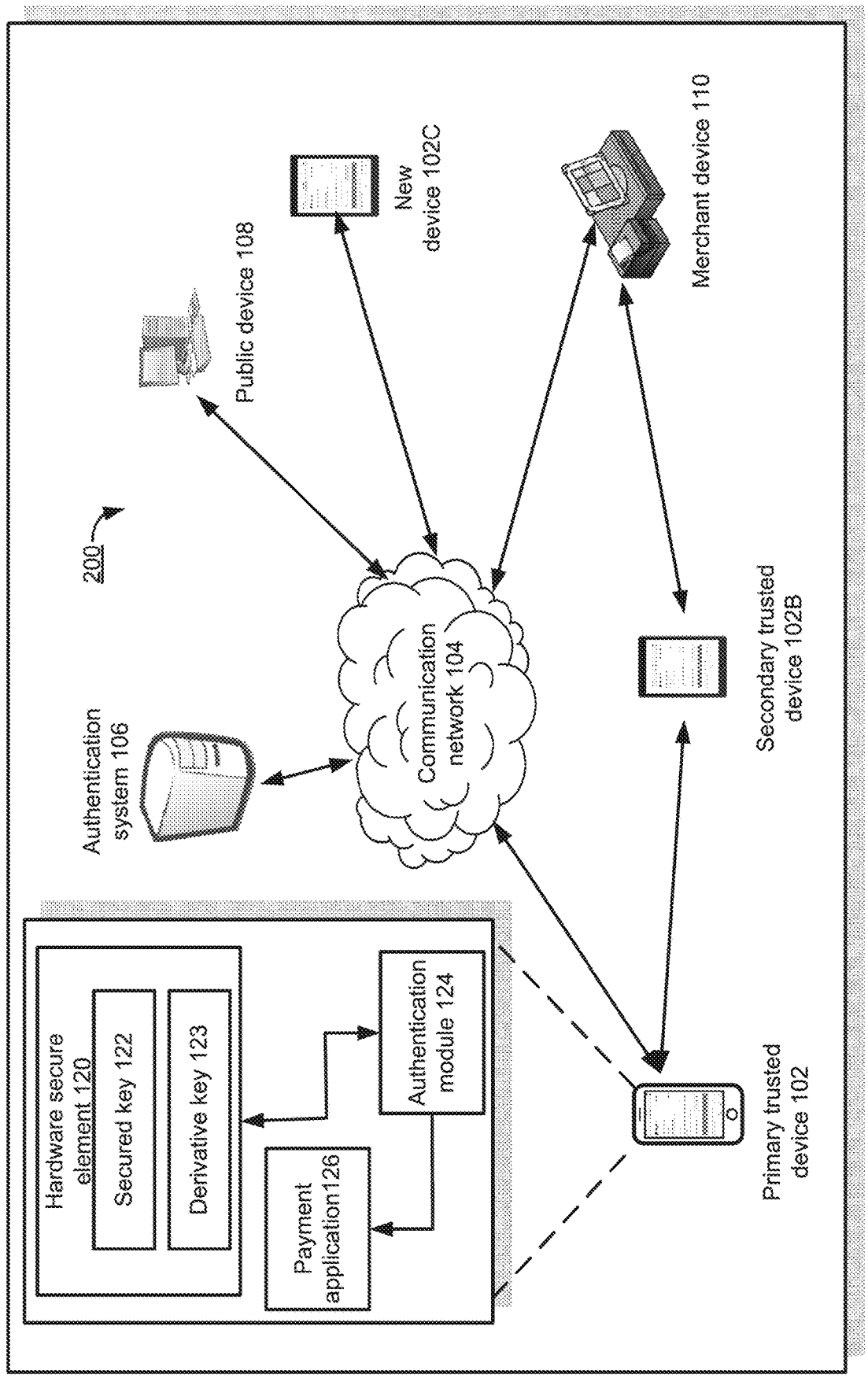
FIG. 2 is a schematic view illustrating an embodiment of a system for managing user data across multiple devices.

FIG. 2 is a schematic view illustrating an embodiment of a system 200 for managing user data across multiple devices. The system 200 may comprise or implement a plurality of servers and/or software components that operate to perform various technologies provided in the present disclosure.

As illustrated in FIG. 2, the system 200 may include a plurality of devices (e.g., 102, 102B, and 102C), an authentication system 106, a public device 108, and a merchant device (e.g., a POS device) 110 in communication over a communication network 104.

In one embodiment, the device 102 (also referred to as a user device in the present disclosure) may enable a user to authenticate herself on the device and to, after a successful authentication, conduct a transaction e.g., with a merchant device, via the communication network 104. For example, after a successful authentication, a user may make payment through a payment application installed and running on the user device 102.

In some embodiments, the device 102 may include a secure element 120, an authentication module 124, and a payment application 126. The user device 102 may be implemented as a smart phone, a tablet computer, a laptop computer, a personal computer, or other computing devices.

The secure element 120 includes a hardware storage area for storing private data—such as a digital identification (ID) or a password of a user—in such a way that it is difficult to compromise (e.g., with multiple levels of encryptions or access restrictions). For example, a secure element of a device may be located in a Universal Integrated Circuit Card (UICC), a Subscriber Identity Module (SIM) card, Secure Data (SD) card or embedded Secure Element (eSE), any of which may be plugged into or otherwise connected with a user device.

In some embodiments, a secure element 120 is implemented using a software mechanism. For example, the secure element may be a storage area to which the access is restricted, e.g., a secure hard drive or memory partition.

In some embodiments, the secure element 120 stores one or more keys identifying a user or her login identifier. The one or more keys may include a primary key 122 and optionally a derivative key 123, which may be used to identify whether a user device is a trusted device In some embodiments, the user device 102 includes an authentication module 124 which may be used to authenticate a user on the user device 102. In some embodiments, the authentication application 124 may determine whether to apply a GPM in one or more applications installed on the user device 102.

For example, after a successful user authentication, the authentication module 124 may obtain information identifying the GPM from the authentication system 106 and apply it to the one or more merchant apps installed on the user device 102.

For another example, after a successful user authentication, the authentication module 124 may obtain information identifying the GPM from the payment application 126 and apply it to the one or more merchant apps installed on the user device 102.

In one alternative embodiment, the authentication module 124 may collect credentials from a user and compare the collected credentials with previously accepted credentials to decide whether to authenticate a user. For example, the authentication module 154 may (1) collect, from a user, a user or device identifier such as an email address, device ID, user name, a password or PIN, an audio/video fingerprint, biometric data (e.g., voice, fingerprint, gesture), or other credential information, (2) match credential information to previously accepted or stored credential information, and (3) authenticate the user when a match occurs.

In one other alternative embodiment, the authentication module 124 may authentication a user using FIDO technologies or any other authentication technologies. The passwordless FIDO technology is supported by the Universal Authentication Framework (UAF) protocol. In some embodiments, a user registers her device to the online service by selecting a local authentication mechanism such as swiping a finger, looking at the camera, speaking into the mic, entering a PIN, etc. The UAF protocol allows the service to select which mechanisms are presented to the user.

The second factor FIDO technology is supported by the Universal Second Factor (U2F) protocol. This technology allows online services to augment the security of their existing password infrastructure by adding a strong second factor to user login. The user logs in with a username and password as before. The service can also prompt the user to present a second factor device at any time it chooses. The strong second factor allows the service to simplify its passwords (e.g. 4-digit PIN) without compromising security.

The payment application 152 may be used, for example, to initiate a payment from a user account (e.g., maintained by a payment service system) to a payee (e.g., a merchant device or another user device) over the communication network 104. The payment application 152 may be implemented as a smartphone app or a web browser.

In some embodiments, a user device 102 is considered a trusted device after a user registers the user device 102 with a service provider (also referred to as a device on-boarding process in the present disclosure). For example, after meeting a predefined number of authentication criteria, a user can register, with the service provider, a corresponding device identifier (e.g., a phone number or an IMEI number) that identifies the user device 102. After a successful on-boarding process, the service provider may generate a key based on the device identifier, a user identifier, or both, and store the key in a secure element of the user device 102. In some embodiments, a user may have two or more trusted devices, e.g., the primary trusted device 102 and the secondary trusted device 102B. In some embodiments, the primary trusted device 102 can deny a request for setting a GPM on secondary device 102B in the event that this request is not recognized by the user.

In some implementations, the communication network 104 communicatively interconnects one or more of the user devices 102 with each other, with the authentication system 106, and/or with a public device 108. In some implementations, the communication network 104 optionally includes the Internet, one or more local area networks (LANs), one or more wide area networks (WANs), other types of networks, or a combination of such networks.

In an embodiment, the authentication system 106 enables a user to select a GPM after a successful authentication. Once obtaining a user selection of a GPM, the authentication system may provide the GPM in any application running on a trusted device.

In an embodiment, the public device 108 includes a device that is accessible to the general public or to more than a predefined number of users who are not related to each other within a predefined number of connections, e.g., strangers rather than family members. For example, the public device 108 may be a computer in a public library or a school computer lab. In an embodiment, upon determining that a device includes a public device, the authentication system 106 refrains from storing a key on the device, because storing the key on a public device, even in an encrypted form, may increase of the risk of jeopardizing private user information. In some embodiments, therefore, a public device is not deemed a trusted device by the authentication 106, regardless the frequency of user logins from the public device. In another embodiment, whether a device is public may be defined by the user and/or the service provider. For example, a home computer that the user and the user's children have access to may be designated as a public device by the user because the user may not want the children to be authenticated or have access to certain content or conduct transactions on the home computer. In an embodiment, a device is determined to be a public device if it is accessible to more than five users not residing in the same household. In an embodiment, a device is determined to be a public device if it is own by a public entity (e.g., a city government).

In an embodiment, the system 160 may apply a GPM to applications running on a public device. In an alternative embodiment, the system 160 does not apply a GPM to any applications running on a public device, e.g., to provide user privacy.

Figure 2B:
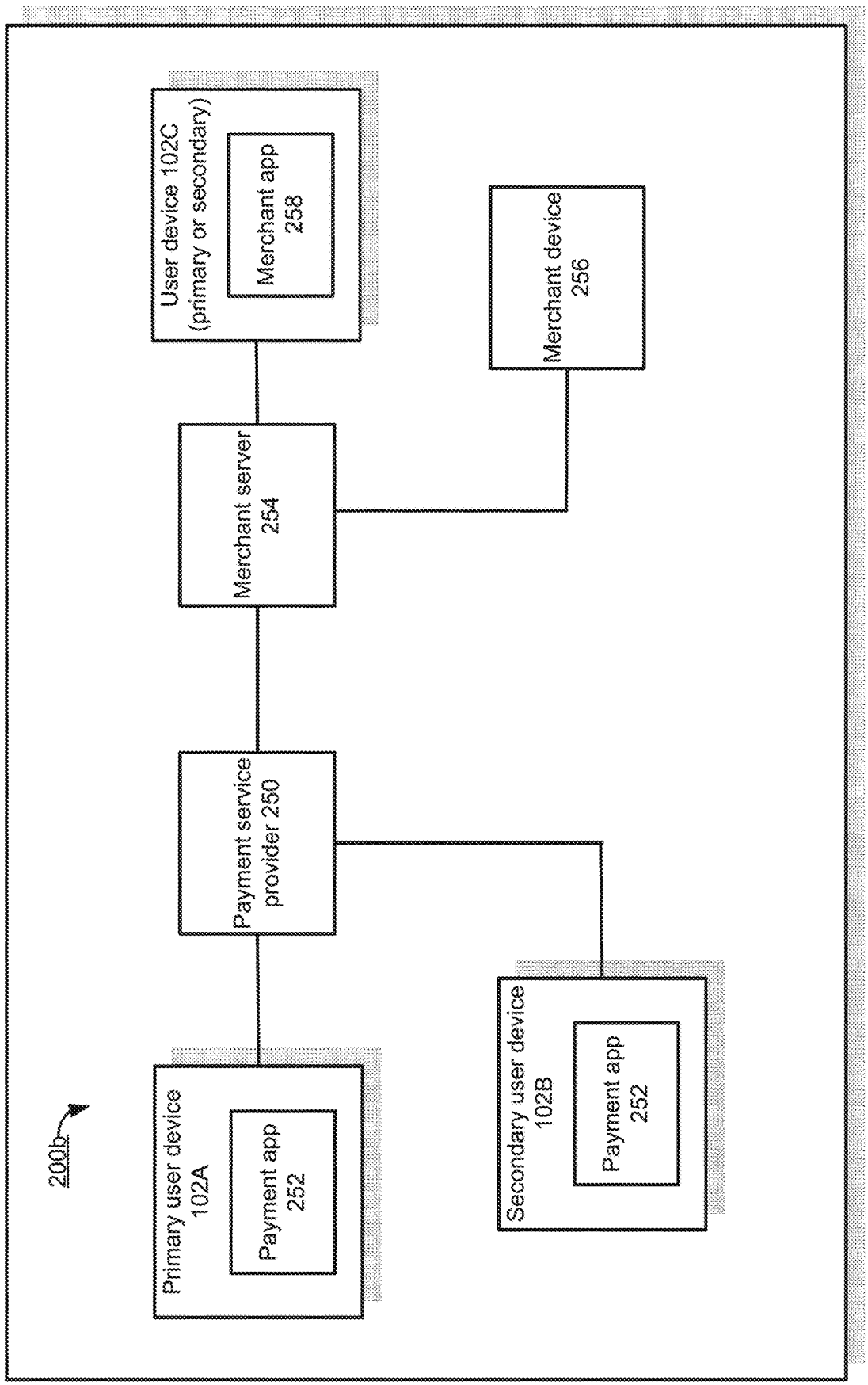
FIG. 2B is a schematic view illustrating an embodiment of a system for managing user data across multiple devices.

FIG. 2B is a schematic view illustrating an embodiment of a system 200b for managing user data across multiple devices.

As shown in FIG. 2B, multiple trusted devices (102A and 102B) of a user may be connected to a payment processing server of a payment service provider 250. The payment processing server may be connected with a merchant server 254 for making a payment to a merchant or processing a refund to a user by the merchant.

In one embodiment, a secondary user device 102C may be connected to a merchant server 254 through a merchant app 258 e.g., for online shopping and payment processing purposes, for example, when a user is paying for an order with a merchant credit or gift card previously purchased form the merchant.

The merchant server 254 may be connected with one or more merchant devices 256, e.g., POS machines for processing payment in a brick-and-mortar store. Each of the user devices 102 may include a payment app or a merchant app for processing a payment to a merchant, either through the payment service provider 250 or directly with the merchant server 254.

Figure 3:
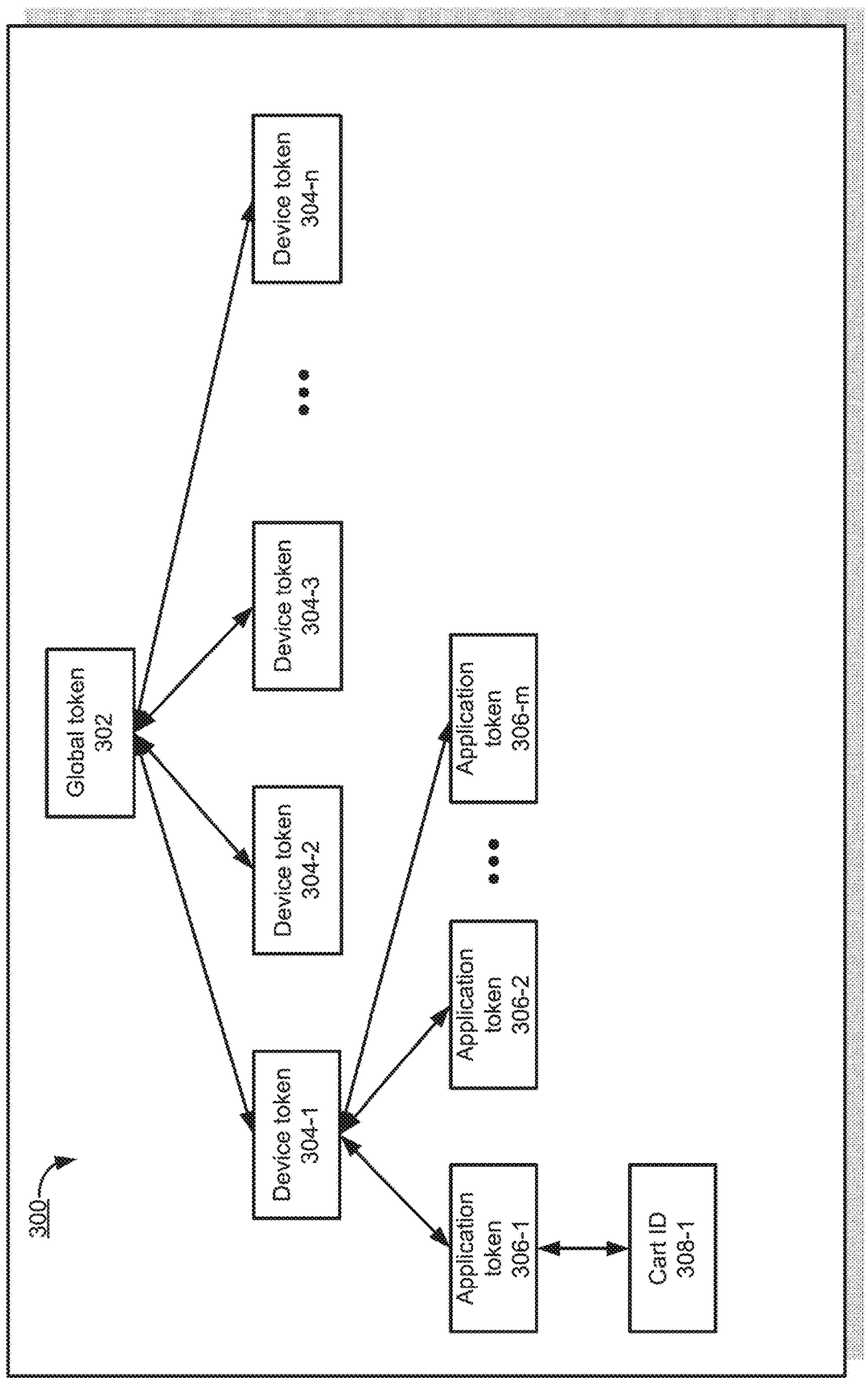
FIG. 3 is a schematic view illustrating an embodiment of a data structure for managing user preference data across multiple applications and devices.

FIG. 3 is a schematic view illustrating an embodiment of a data structure 300 for managing user preference data across multiple applications and devices.

As shown in FIG. 3, a global token 302 may indicate whether a GPM has been enabled by a user. Each of the device tokens 304-1, 304-2, 304-3 ... 304-m may indicate on which user device the GPM has been enabled. Each of the application tokens 306-1, 306-2 ... 306-n may indicate on which application of app the GPM has been enabled. The cart ID 308-1 may indicate which shopping cart the GPM may be applied to, e.g., a taxi-ride or a cart of four clothing items.

The data structure 300 may also be stored as a linear structure, for example,

{Global token 302; device tokens 304-1, 304-2, 304-3 ... 304-m; application tokens 306-1, 306-2 ... 306-n; the cart ID 308-1}.

The data structure 300 may also be stored as a graph structure, for example, where the nodes are user accounts registered on a same or different device or application tokens enabled on a same or a different device.

In an embodiment, the data structure 300 is stored on the authentication system 106 for access by one or more user devices. In an embodiment, the data structure 300 is also stored in an authentication module 124 of the user device for access by one or more application running on the user device.

In still one embodiment, a server copy of the data structure 300 is stored on the authentication system 106; and a local copy of the data structure 300 is stored on a user device. The copies of the data structure 300 are then synchronized on a predefined schedule (e.g., every twenty-four hours) or in response to a predefined event (e.g., an onboarding event).

Figure 4:
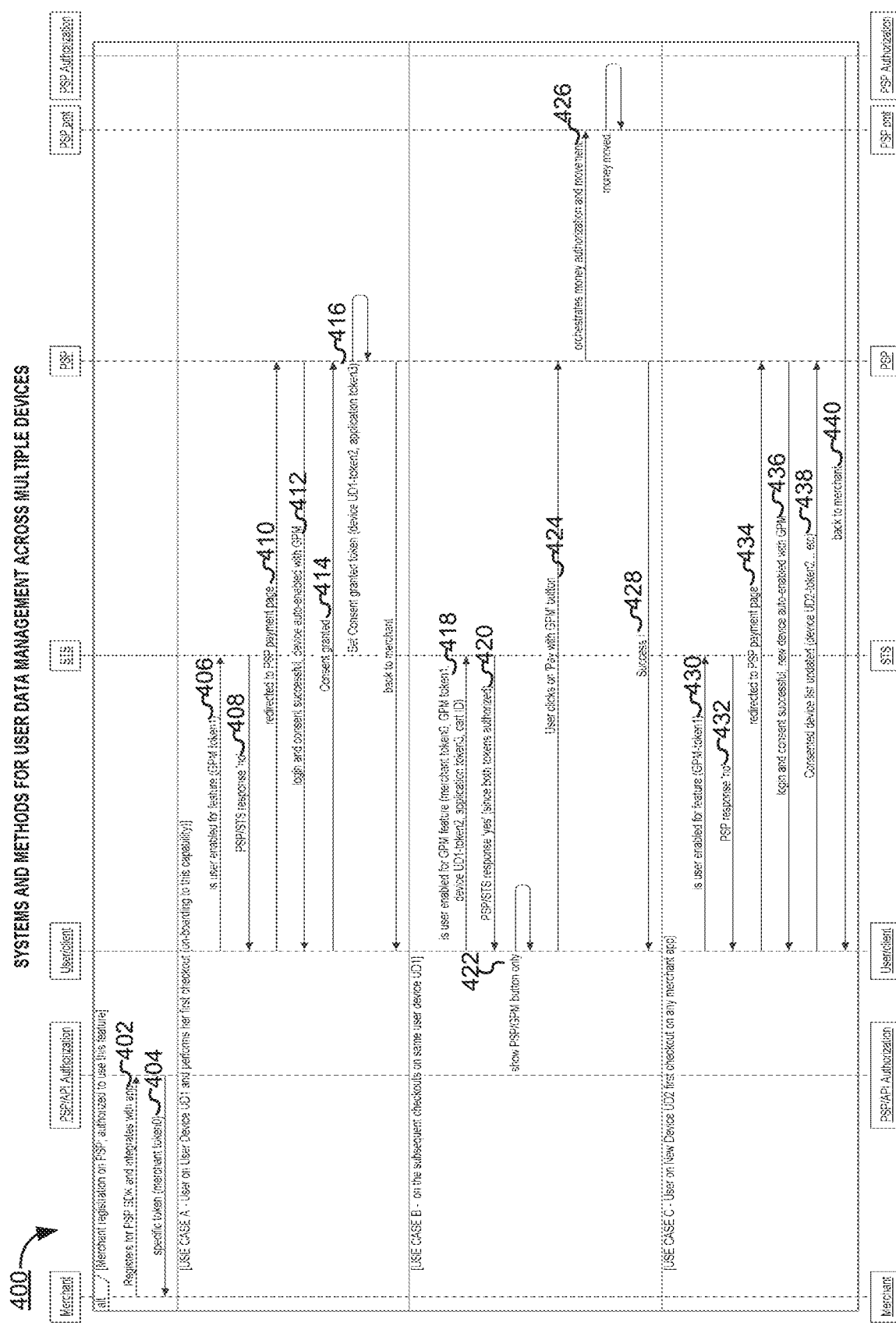
FIG. 4 is a flow chart illustrating an embodiment of a method for managing user data across multiple applications and devices.

FIG. 4 is a flow chart illustrating an embodiment of a method 400 for managing user data across multiple applications and devices. The device 102, for example, when programmed in can perform the method 400. accordance with the technologies described in the present disclosure, As part of the method 400, a merchant may register (402) its information with a PSP, e.g., the PAYPAL INC. For example, a merchant may provide information about its smartphone app and information about its business mode, and, once a merchant is verified, the PSP may provide (404) the merchant an SDK for enabling a payment method supported by the PSP in the merchant's smartphone app, as well as a special token.

Another part of the method 400 describes an onboarding process for enabling a specific payment method on a user device. An onboarding process is a process where a user is signing up for a service or site and can include checking out or otherwise attempting to make a payment through any application installed on a user device for the first time. The steps 406-416 are collectively referred to as the initial onboarding process.

When a user is checking out, e.g., making a payment, the user device communicates with a Secure Token Service (STS), which may be part of the authentication system 106, to determine whether a GPM has been enabled on this user device.

If a GPM is not (408) enabled on this user device, the user device is redirected (410) to communicate with the PSP. The PSP, in response, requests (412) the user to log into her payment account registered with the PSP and optionally provide consent to assign a preferred payment method as the default payment method on all merchant applications installed or to be installed on the user device.

Upon user's consent (414), the PSP stores a device token (414), which identifies (416) (e.g., to the STS) that a GPM has been enabled for all merchant applications installed or to be installed on the user device.

A third part of the method 400 describes a checkout process that occurs after the onboarding process.

As part of this process, when a user is checking out, e.g., making a payment, the user device communicates (418) with the STS to determine whether a GPM has been enabled on the user device. Based on the existence of the device token (as constructed at the step 416), the STS determines (420) that a GPM is enabled on the user device and notifies the user device regarding the same.

As a result, the user device provides (422) the GPM as the sole or default payment method for the user to complete the checkout process.

When the user selects (424) the GPM to continue the checkout process, the payment service system (provided by the PSP) authenticates (426) the user and processes a payment accordingly. After the payment is successfully processed, the user device is notified (428).

Another part of the method 400 describes a checkout process that occurs on a new (e.g., where the user has not been on boarded yet with the service or app) device after the onboarding process. This process, which may include steps 430-440, is also referred to as the new device onboarding process.

As part of this process, when a user is checking out, e.g., making a payment, on a new user device (e.g., a device on which the GPM is not yet enabled), the new device communicates (430) with the STS to determine whether the GPM has been enabled on the new device.

Based on the absence of the corresponding device token (which identifies the new device as a device on which the GPM is enabled), the STS determines (432) that the GPM is not yet enabled on the user device and notifies the user device regarding the same.

As a result, the user on the new device is redirected (434) to authenticate with the PSP. The PSP, in response, requests (412) the user to log into her payment account registered with the PSP and, in response to a successful login, automatically enables the GPM as the default or sole payment method on all merchant applications installed or to be installed on the new device as well.

Once the GPM is enable on the new device, the PSP, updates (438) the device list, which identifies one or more devices on which the GPM is enabled as the default or sole payment method, and presents the next step of the checkout process on the new device.

Figure 5:
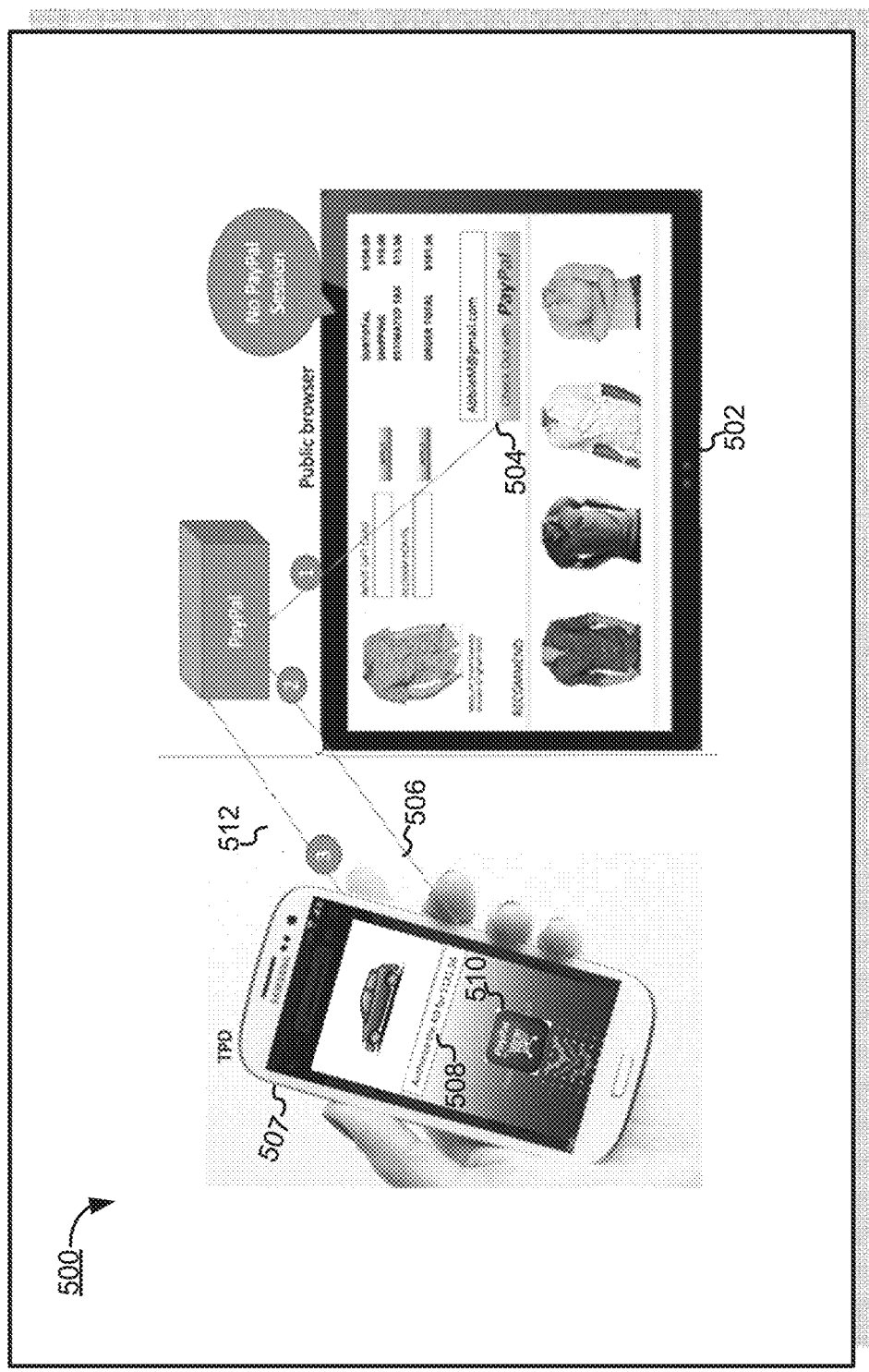
FIG. 5 is a schematic view illustrating an embodiment of a method for managing user data across multiple applications and devices.

FIG. 5 is a schematic view illustrating an embodiment of a method 500 for managing user data across multiple applications and devices. The user device 102, for example, when programmed in accordance with the technologies described in the present disclosure, can perform the method 500.

As shown in FIG. 5, when a user is conducting a transaction in an application (e.g., a web browser) installed on a first user trusted device (e.g., the tablet computer) 502, the user may designate a GPM, e.g., for not only other applications installed on the first trusted device 205, but also applications installed on other trusted devices, e.g., the smartphone 508.

As shown in FIG. 5, the GPM the user enabled on the trusted device 502 is her PAYPAL account 504; the user is making a payment to an online clothing merchant using her PAYPAL account on the device 502.

Because the device 502 is a trusted device, the authentication system 106 may store information identifying that the user has selected her PAYPAL account as her GPM and may provide (at step 506) the user's PAYPAL account as the default or sole payment method when the user operates a different application on a different user device, e.g., another trusted device 507.

As shown in FIG. 5, when the user is making a payment in a ride sharing application 508 on the smartphone 507, her PAYPAL account 510 is provided as the payment method. At step 512, the user may modify her global payment method to a different payment method for the particular transaction or as her new global payment method.

Figure 6:
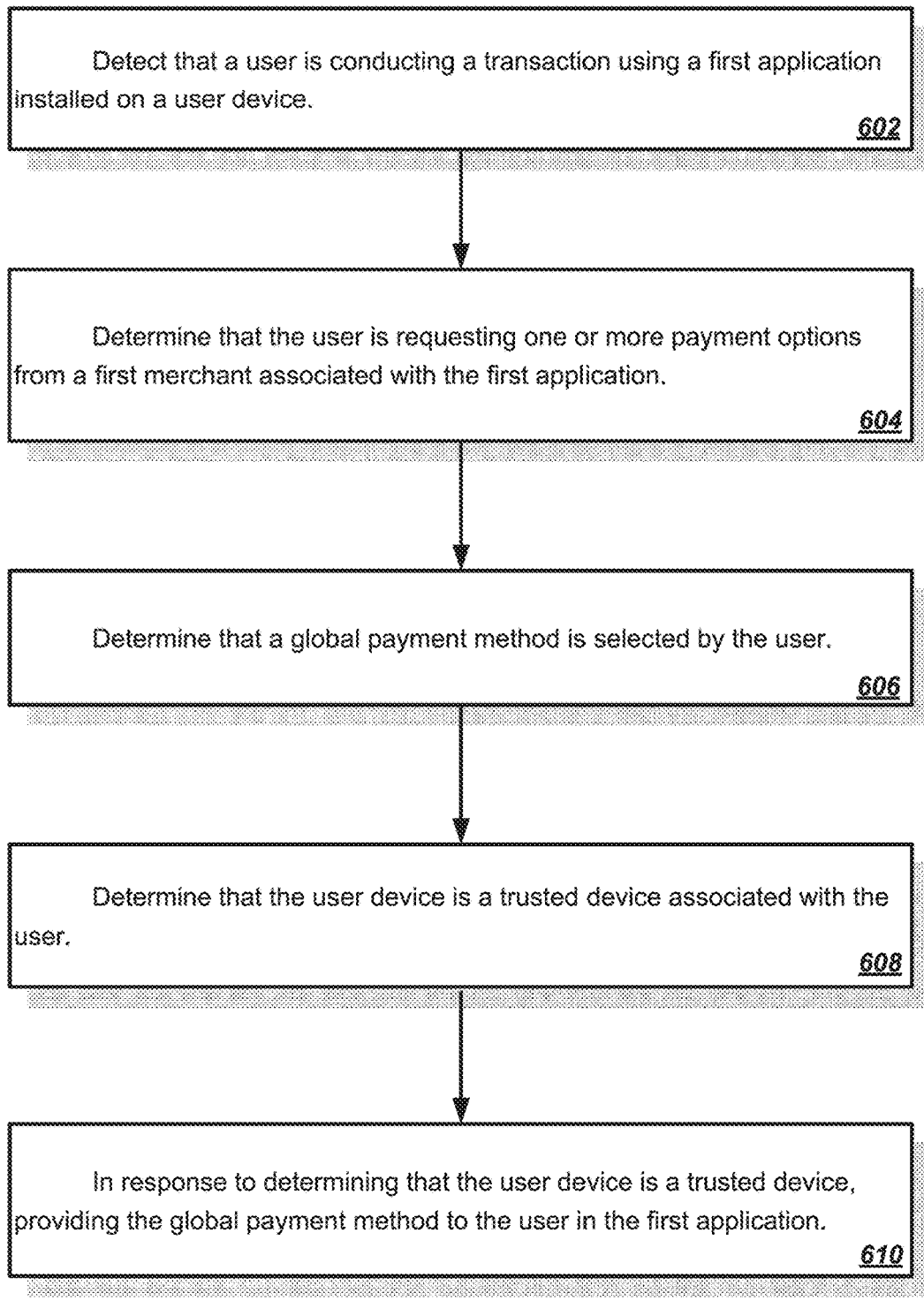
FIG. 6 is a flow chart illustrating an embodiment of a method for managing user data across multiple applications and devices.

FIG. 6 is a flow chart illustrating an embodiment of a method 600 for managing user data across multiple applications and devices.

In some embodiments, the method 600 includes detecting (602) that a user is conducting a transaction using a first application installed on a user device, for example, a user is making a payment in a taxi app.

In some embodiments, the method 600 includes determining (604) that the user is requesting one or more payment options from a first merchant associated with the first application.

In some embodiments, the method 600 includes determining (606) that a GPM is selected by the user;

In some embodiments, the method 600 includes determining (608) that the user device is a trusted device associated with the user.

In some embodiments, the method 600 includes in response to determining that the user device is a trusted device, providing (610) the GPM to the user in the first application.

In some embodiments, the GPM is a payment method selected by the user in a plurality of applications. For example, the GPM may be a credit card account that has been enabled for payment in the taxi app 156A, the grocery app 156B, and the shopping app 156C.

In some embodiments, the GPM is a payment method selected by the user on a plurality of user devices. For example, the GPM may be a checking account that has been enabled for payment for applications (e.g., some or all) running on the device 102, the device 1020B, the device 102C.

In some embodiments, the in response to determining that user device is a trusted device, excluding, from providing to the user, a second payment method provided by the first merchant.

For example, once a user selects a GPM, the PSP supporting the GPM may exclude other applicable methods or funding sources from being provided to the user.

In another example, once a user enables a checking account as a GPM in the taxi app 156, other payment method, e.g., a credit card account, a line or credit account, or a debit card account, although available from their respective providers, are excluded as payment methods from the grocery app 156B and the lunch app 156D.

In some embodiments, the providing the GPM to the user in the first application comprises: providing the GPM as the only payment method to the user in the first application.

For example, once a user selects a GPM, the PSP supporting the GPM may provide the GPM as the sole payment method.

In another example, once a user enables a checking account as a GPM, the checking account may be provided as the sole payment method in the grocery app 156B and the shopping app 156C.

In some embodiments, the determining that a GPM is selected by the user comprising: determining that the GPM is selected by the user in a second application installed on the user device.

This is sometimes referred to as the "a single payment method across multiple devices" feature. A payment method, once enabled in one application as a GPM, may become the only payment method in another application on that device. A payment method, once enabled in one application on a device as a GPM, may become the only payment method in another application across multiple devices belonging to the user.

In some embodiments, the method 600 includes detecting the user is conducting a second transaction using a second application installed on a second user device; determining that the second user device is a trusted device associated with the user; and in response to determining that the user device is a trusted device, providing the GPM to the user in the second application.

In some embodiments, the determining that the user device is a trusted device associated with the user comprises: detecting a secure key is present in a secure element of the user device. In some embodiments, the secure key is present in a secure element of the user device. For example, whether a device is a trusted device may be determined based on whether a secure element of the device includes a secure key, which can enable a user to login into a payment account of hers without providing a password on the device.

In some embodiments, a GPM may be overridden. On a per device level, for example, a user can filter out device where the GPM is not applicable or may not be applied as the default or sole payment method. In some embodiments, a specific application (e.g., a merchant app) may use ODCDA for certain actions in the app (e.g., see balance), while requests a higher level of authentication (e.g., a full user name and password match) for certain other actions in the app (e.g. move money). In these cases, there is an on device and server based recognition to request for different types of authentication for this purpose.

On a per cart or check out level, for the GPM (e.g., a credit card account) may be overridden and one or more other payment methods (e.g., a checking account and a home equity line of credit account) may be provided for a user to select.

Figure 7:
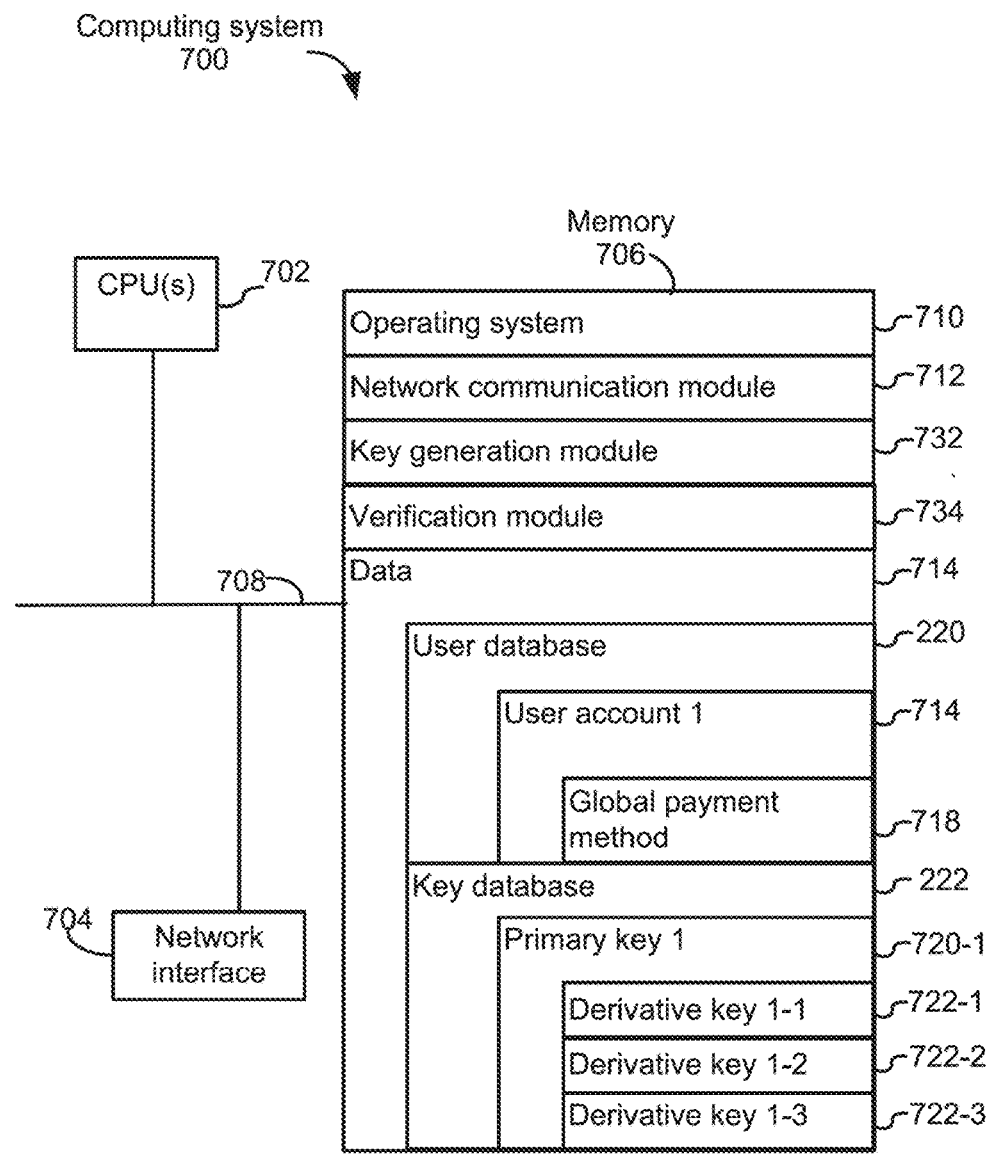
FIG. 7 is a schematic view illustrating an embodiment of a computing system.

FIG. 7 is a schematic view illustrating an embodiment of a computing system 700, which can be the authentication system 106 shown in FIG. 2. The system 700 in some implementations includes one or more processing units CPU(s) 702 (also referred to as hardware processors), one or more network interfaces 704, a memory 706, and one or more communication buses 708 for interconnecting these components. The communication buses 708 optionally include circuitry (sometimes called a chipset) that interconnects and controls communications between system components. The memory 706 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706, or alternatively the non-volatile memory device(s) within the memory 706, comprises a non-transitory computer readable storage medium. In some implementations, the memory 706 or alternatively the non-transitory computer readable storage medium stores the following programs, modules and data structures, or a subset thereof:

an operating system 710, which includes procedures for handling various basic system services and for performing hardware dependent tasks;

a network communication module (or instructions) 712 for connecting the system 700 with other devices (e.g., a trusted user device, an untrusted user device, a public device, or a merchant device) via one or more network interfaces 704;

a key generation module 732 for generating or obtaining one or more keys based on a user identifier, a device identifier, an application identifier, or any combination thereof;

a verification module 734 for verifying whether a user device is trusted device or not, e.g., based on whether a corresponding key can be located on the device; and data 714 stored on the system 700, which may include a device database, a risk databases, as well as the following components:

a user database 162 for storing information identifying one or more user accounts 714, each of which may be associated with a corresponding GPM 718; and a key database 222 for storing a primary key 720-1 and optionally one or more secondary keys 722-1, 722-2, and 722-3 in association with the primary key.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 706 optionally stores a subset of the modules and data structures identified above. Furthermore, the memory 706 may store additional modules and data structures not described above.

Figure 8:
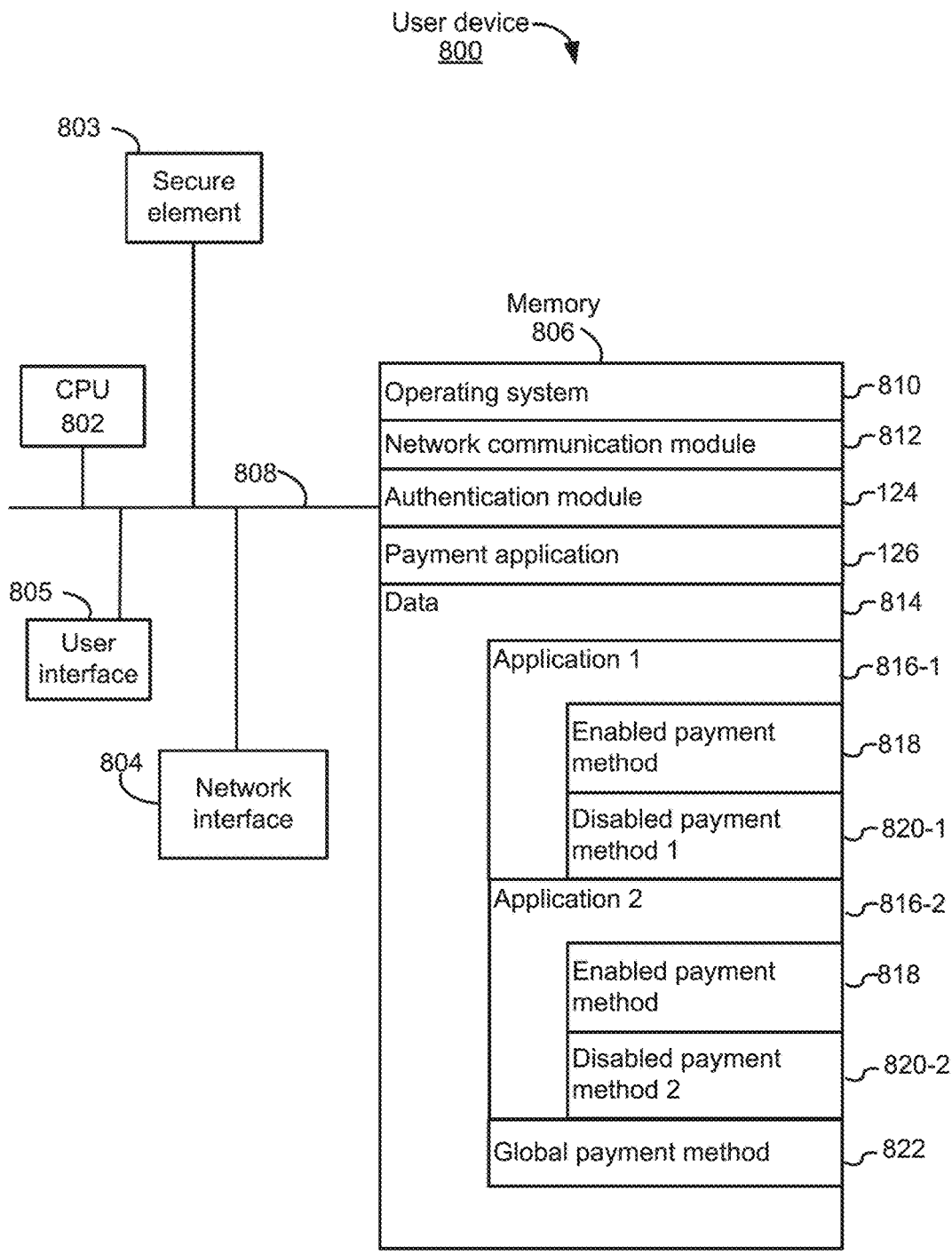
FIG. 8 is a schematic view illustrating an embodiment of a user device.

FIG. 8 is a schematic view illustrating an embodiment of a user device 800, which can be the 102 shown in FIG. 1. The device 800 in some implementations includes one or more processing units CPU(s) 802 (also referred to as hardware processors), one or more secured elements 803, one or more network interfaces 804, a user interface 805, a memory 808, and one or more communication buses 808 for interconnecting these components. The communication buses 808 optionally include circuitry (sometimes called a chipset) that interconnects and controls communications between system components. The memory 808 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 808 optionally includes one or more storage devices remotely located from the CPU(s) 802. The memory 808, or alternatively the non-volatile memory device(s) within the memory 808, comprises a non-transitory computer readable storage medium. In some implementations, the memory 808 or alternatively the non-transitory computer readable storage medium stores the following programs, modules and data structures, or a subset thereof:

an operating system 810, which includes procedures for handling various basic system services and for performing hardware dependent tasks;

a network communication module (or instructions) 812 for connecting the device 800 with other devices (e.g., the new device 102C, the public device 108, and the authentication system 106) via one or more network interfaces 804 (wired or wireless) or via the communication network 104 (FIG. 1);

an authentication module 124 for determining which user authentication methods are required based on whether a corresponding key can be located on the user device 800 or not;

a payment application 126 for conducting transactions with (e.g., sending a payment to or receiving a payment from) a merchant device or another user device;

data 814 stored on the device 800, which may include:
one or more application (e.g., smartphone apps) 816-1 and 816-2 installed on the user device 800, each of the applications may include information identifying the following:
an enabled payment method 818; and
one or more disabled payment method 820-1 and 820-2 (e.g., credit card accounts or checking accounts); and
a GPM 822 (e.g., a user account with a PSP), e.g., a payment method that a user of the user device has selected for payment on the at least one of the applications 816- and 816-2.

The one or more secured elements 803 may storage one or more secure keys (e.g., a primary key and one or more derivative keys). The device 800 may further include a location determination component (e.g., a Global Positioning System (GPS) device and a cell tower triangulation device) for providing location information of the device 800.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 806 optionally stores a subset of the modules and data structures identified above. Furthermore, the memory 806 may store additional modules and data structures not described above.

Although FIGS. 7 and 8 show a "computing system 700" and a "user device 800," respectively, FIGS. 7 and 8 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
identifying, for each of a first application of a first merchant and a second application of a second merchant, a setting of a flag associated with a predefined cross-device authentication technology;
determining, based on the identified setting of the flag for each of the first application and the second application, that the first application and the second application are integrable with a payment application of a payment provider;
integrating, via one or more hardware processors of a payment provider, the first application and second application with a software development kit (SDK) of the payment application of the payment provider;
adding, after the integrating, the first application and the second application to a list of applications for which a global payment method (GPM) is enabled;
detecting, via the one or more hardware processors of the payment provider, that a user is conducting a transaction using the first application that is installed on a first user device;
determining, via the one or more hardware processors of the payment provider, that the user is requesting one or more payment options from the first merchant;
determining, via the one or more hardware processors of the payment provider, that the GPM is selected by the user;
determining, via the one or more hardware processors of the payment provider, that the first user device is a first trusted device associated with the user;
in response to determining that the first user device is the first trusted device, performing the following operations via the one or more hardware processors of the payment provider:
generating a first key that identifies the first user device as being the first trusted device;
sending the first key to a secure element of the first user device;
granting, based on a presence of the first key in the secure element of the first user device, the user an access to a user account with the payment provider without requiring the user to enter user authentication credentials; and providing the GPM to the user in the first application;

detecting, via the one or more hardware processors of the payment provider, that the user is conducting a second transaction using the second application that is installed on a second user device;

determining, via the one or more hardware processors of the payment provider, that the second user device is a second trusted device associated with the user; and in response to determining that the second user device is the second trusted device, performing the following operations via the one or more hardware processors of the payment provider:

generating a second key that identifies the second user device as being the second trusted device;

sending the second key to a secure element of the second user device;

granting, based on a presence of the second key in the secure element of the second user device, the user an access to the user account with the payment provider without requiring the user to enter authentication credentials; and automatically providing, in response to a determination that the GPM has been selected by the user for the first application and a determination that the first application and the second application are on the list of applications for which the GPM is enabled, the GPM to the user in the second application as a default payment option or a sole payment option, wherein the GPM provided to the user in the second application is one of a plurality of available payment options and is a same GPM that was provided to the user in the first application.

2. The method of claim 1, wherein the GPM is a payment method selectable from a plurality of user devices.

3. The method of claim 1, further comprising:

in response to determining that the first user device is the first trusted device, or that the second user device is the second trusted device: excluding, from providing to the user, a second payment method provided by the first merchant.

4. The method of claim 1, wherein providing the GPM to the user in the first application comprises: providing the GPM as an only payment method to the user in the first application.

5. The method of claim 1, wherein the determining that the first user device is the first trusted device comprises:

determining that the user has met a predefined number of authentication criteria; and registering a device identifier of the first user device with the payment provider.

6. The method of claim 5, wherein the device identifier includes a phone number or an International Mobile Equipment Identity (IMEI) number.

7. The method of claim 1, wherein the integrating comprises providing the SDK to the first merchant and to the second merchant.

8. The method of claim 1, wherein the secure element of the first user device or the second user device includes a Universal Integrated Circuit Card (UICC), a Subscriber Identity Module (SIM) card, Secure Data (SD) card, embedded Secure Element (sSE), or a memory partition on a hard drive.

9. The method of claim 1, wherein the generating of the first key comprises generating the first key based on a user identifier of the user or a device identifier of the first user device.

10. The method of claim 1, wherein the detecting that the user is conducting a second transaction comprises detecting that the user is conducting the second transaction with a second merchant different from the first merchant.

11. The method of claim 1, further comprising: generating a token in response to the determination that the GPM has been selected by the user for the first application, the token indicating one or more devices for which the GPM has been enabled.

12. A non-transitory machine-readable medium having stored thereon machine-readable instructions executable to cause a machine of a payment provider to perform operations comprising:

integrating, via one or more hardware processors of a payment provider, a first application of a first merchant and a second application of a second merchant with a software development kit (SDK) of a payment application of the payment provider;

adding, after the integrating, the first application and the second application to a list of applications for which a global payment method (GPM) is enabled;

scanning a system registry or an application registry of two or more user devices;

determining a list of applications that have not enabled a predefined cross-device authentication technology;

detecting that a user is conducting a transaction using the first application that is installed on a first user device of the two or more user devices;

determining that the user is requesting one or more payment options from the first merchant;

determining that the GPM is selected by the user;

determining that the first user device is a first trusted device associated with the user;

in response to determining that the first user device is the first trusted device, performing the following operations:

generating a first key that identifies the first user device as being the first trusted device;

sending the first key to a secure element of the first user device for electronic storage;

granting, based on a presence of the first key in the secure element of the first user device, the user an access to a user account with the payment provider without requiring the user to enter user authentication credentials; and providing the GPM to the user in the first application;

detecting that the user is conducting a second transaction using the second application that is installed on a second user device of the two or more user devices;

determining that the second user device is a second trusted device associated with the user; and in response to determining that the second user device is the second trusted device, performing the following operations:

generating a second key that identifies the second user device as being the second trusted device;

sending the second key to a secure element of the second user device;

granting, based on a presence of the second key in the secure element of the second user device, the user an access to the user account with the payment provider without requiring the user to enter authentication credentials; and automatically selecting, in response to a determination that the GPM has been selected by the user for the first application and a determination that the first application and the second application are on the list of applications for which the GPM is enabled, the GPM as a default payment option or a sole payment option in the second application, wherein the GPM provided to the user in the second application is one of a plurality of available payment options and is a same GPM that was provided to the user in the first application, and wherein the automatically selecting the GPM as the default payment option or a sole payment option further comprises: based on a determination that the second application is in the list of applications that have not enabled the predefined cross-device authentication technology, overriding an existing set of payment buttons of the second application with the GPM at least in part by redrawing an original page of the second application.

13. The non-transitory machine-readable medium of claim 12, wherein the GPM is a payment method selectable from a plurality of user devices.

14. The non-transitory machine-readable medium of claim 12, wherein the operations further comprise:
in response to determining that the first user device is the first trusted device, or that the second user device is the second trusted device, excluding, from providing to the user, a second payment method provided by the first merchant.

15. The non-transitory machine-readable medium of claim 12, wherein providing the GPM to the user in the first application comprises:
providing the GPM as an only payment method to the user in the first application.

16. The non-transitory machine-readable medium of claim 12, wherein the determining that the first user device is the first trusted device comprises:
determining that the user has met a predefined number of authentication criteria; and
registering a device identifier of the first user device with the payment provider.

17. The non-transitory machine-readable medium of claim 12, wherein the integrating further comprises: providing the SDK to the first merchant and to the second merchant.

18. The non-transitory machine-readable medium of claim 12, wherein the secure element of the first user device or the second user device includes a Universal Integrated Circuit Card (UICC), a Subscriber Identity Module (SIM) card, Secure Data (SD) card, embedded Secure Element (sSE), or a memory partition on a hard drive.

19. The non-transitory machine-readable medium of claim 18, wherein the generating of the first key comprises generating the first key based on a user identifier of the user or a device identifier of the first user device.

20. A payment provider system, comprising:
a non-transitory memory; and
one or more hardware processors coupled to the non-transitory memory and configured to read instructions from the non-transitory memory to cause the payment provider system to perform operations comprising:
scanning a system registry or an application registry of two or more user devices;
determining a list of applications that have not enabled a predefined cross-device authentication technology;
detecting that a user is conducting a transaction using a first application that is installed on a first user device of the two or more user devices;
determining that the user is requesting one or more payment options from a first merchant associated with the first application;
accessing a list of applications for which a global payment method (GPM) is enabled, wherein the first application of a first merchant and a second application of a second merchant has been added to the list after integrating, via a payment provider, the first application and the second application with a software development kit (SDK) of the payment provider;
determining that the GPM is selected by the user;
determining that the first user device is a first trusted device associated with the user;
in response to determining that the first user device is the first trusted device, performing the following operations:
generating a first key that identifies the first user device as being the first trusted device;
sending the first key to a secure element of the first user device;
granting, based on a presence of the first key in the secure element of the first user device, the user an access to a user account with the payment provider without requiring the user to enter user authentication credentials; and
providing the GPM to the user in the first application;
detecting, via the one or more hardware processors of the payment provider, that the user is conducting a second transaction using the second application that is installed on a second user device of the two or more user devices;
determining, via the one or more hardware processors of the payment provider, that the second user device is a second trusted device associated with the user; and
in response to determining that the second user device is the second trusted device, performing the following operations:
generating a second key that identifies the second user device as being the second trusted device;
sending the second key to a secure element of the second user device;
granting, based on a presence of the second key in the secure element of the second user device, the user an access to the user account with the payment provider without requiring the user to enter authentication credentials; and
automatically providing, in response to a determination that the GPM has been selected by the user for the first application and a determination that the first application and the second application are on the list of applications for which the GPM is enabled, the GPM to the user in the second application as a default payment option or a sole payment option, wherein the GPM provided to the user in the second application is one of a plurality of available payment options and is a same GPM that was provided to the user in the first application, and wherein the automatically providing the GPM to the user further comprises: based on a determination that the second application is in the list of applications that have not enabled the predefined cross-device authentication technology, overriding an existing set of payment buttons of the second application with the GPM at least in part by modifying an original page of the second application.

\* \* \* \* \*